(12) United States Patent
Ide et al.

(10) Patent No.: US 7,043,399 B2
(45) Date of Patent: May 9, 2006

(54) ELECTRO-MAGNETIC ANALYSIS PROGRAM OF ELECTRIC ROTATING MACHINE

(75) Inventors: Kazumasa Ide, Chiyoda-ku (JP); Kenji Miyata, Chiyoda-ku (JP); Kazuo Shima, Chiyoda-ku (JP); Masayuki Tani, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 10/639,469

(22) Filed: Aug. 13, 2003

(65) Prior Publication Data

US 2004/0122613 A1    Jun. 24, 2004

(30) Foreign Application Priority Data

Dec. 18, 2002 (JP) ............................... 2002-366020
May 16, 2003 (JP) ............................... 2003-139470

(51) Int. Cl.
G06F 13/10 (2006.01)

(52) U.S. Cl. ...................... 702/183; 702/156; 702/179; 702/188

(58) Field of Classification Search ................ 702/115, 702/122, 147, 156, 179, 188, 183; 290/44; 318/805, 569, 600, 629; 714/1
See application file for complete search history.

(56) References Cited

U.S. PATENT DOCUMENTS 5,640,472 A  *  6/1997  Meinzer et al. ............... 385/26
6,091,215 A  *  7/2000  Lovett et al. ................ 318/254
6,670,721 B1 * 12/2003  Lof et al. ..................... 290/44
6,763,263 B1 *  7/2004  Gregory et al. ............. 600/547

OTHER PUBLICATIONS

Kane S. Yee; Numerical Solution of Initial Boundary Value Problems Involving Maxwell's Equations in Isotropic Media; May 1996; IEEE; vol. AP-14, No. 3; pp. 302-307.*
Melinda Piket-May et al.; FD-TD Modeling of Digital Signal Propagation in 3-D Circuits with Passive and Active Loads; Aug. 1994; IEEE vol. 42 No. 8; pp. 1514-1523.*
T.W. Preston, A.B.J. Reece and P.S. Sangha: "Induction motor analysis by tome-stepping techniques" IEEE Trans. On Magnetics, vol. 26, No. 2, pp. 551-554, 1990.

* cited by examiner

*Primary Examiner*—Marc S. Hoff
*Assistant Examiner*—Felix Suarez
(74) *Attorney, Agent, or Firm*—Crowell & Moring LLP

(57) ABSTRACT

(Subject)

To provide an electro-magnetic field analysis technique of an electric rotating machine that filters through a specific higher-harmonic at a specific portion.

(Construction)

The first electro-magnetic field analysis procedure of analyzing the electro-magnetic field in an analysis space based on the first boundary condition in terms of an electro-magnetic variable assigned to the first specific portion in the analysis space; a development procedure 2 of developing the electro-magnetic variable at the second specific portion in the analytic space, obtained in the first electro-magnetic field analysis procedure, into each higher-harmonic component; the second boundary condition setting procedure of assigning an electro-magnetic variable in terms of at least one of the higher-harmonic components, developed from the above electro-magnetic variable, to the second specific portion as the second boundary condition; and a procedure 3 of analyzing the electro-magnetic field of the analysis space based on the first and second boundary conditions are executed on a computer.

13 Claims, 10 Drawing Sheets

ELECTRO-MAGNETIC ANALYSIS PROGRAM OF ELECTRIC ROTATING MACHINE

BACKGROUND OF THE INVENTION 1. (Field of the Invention)

The present invention relates to the electro-magnetic field analysis technique of an electric rotating machine, particularly to the electro-magnetic field analysis technique of an electric rotating machine that can decompose the electro-magnetic field of the electric rotating machine into multiple higher-harmonic components and leakage magnetic flux that comprise the electro-magnetic field distribution.

2. (Prior Art)

A conventional electro-magnetic field analysis of an electric rotating machine employs a time-stepping technique in which the analysis is accomplished step by step as the rotor is turned gradually (for example, see the Non-Patent Document 1).

[Non-Patent Document 1]

T. W. Preston, A. B. J. Reece and P. S. Sangha: "Induction motor analysis by time-stepping techniques", IEEE Trans. on Magnetics, vol. 26, No. 2, pp. 551–554, 1990.

SUMMARY OF THE INVENTION (Problems to be Solved by the Invention)

Vibration, noise, iron loss, eddy current loss, etc. are caused by specific higher-harmonic component. With the conventional electro-magnetic field analysis technique of an electric rotating machine, however, the electro-magnetic field distribution obtained through the analysis contains multiple higher-harmonic components and independent electro-magnetic field analysis of higher-harmonic component is not feasible. In other words, because multiple components are all superimposed in the electro-magnetic field distribution obtained through the conventional electro-magnetic field analysis, there arises a problem that electro-magnetic field distribution by each specific higher-harmonic, which is useful for identifying a troublesome higher-harmonic or examining a measures to reduce the vibration, noise, iron loss or eddy current loss, is not available. Besides, it would be very much convenient if three-dimensional electro-magnetic field analysis is available in addition to two-dimensional analysis.

An object of the present invention is to provide an electro-magnetic field analysis technique of an electric rotating machine, with which the electro-magnetic field distribution of specific spatial higher-harmonic or time higher-harmonic is displayed so that the designer of the rotating machine can obtain information useful for analyzing the vibration and noise.

(Means for Solving the Problems)

According to an aspect of the present invention, there is provided an electro-magnetic field analysis program of an electric rotating machine for a computer to execute the first electro-magnetic field analysis procedure of analyzing the electro-magnetic field in an analysis space based on the first boundary condition in terms of an electro-magnetic variable assigned to the first specific portion in the analysis space; a development procedure of developing the electro-magnetic variable at the second specific portion in the analytic space, obtained in the first electro-magnetic field analysis procedure, into each higher-harmonic component; the second boundary condition setting procedure of assigning an electro-magnetic variable in terms of at least one of the higher-harmonic components, developed from the electro-magnetic variable, to the second specific portion as the second boundary condition; and a procedure of analyzing the electro-magnetic field of the analysis space based on the first and second boundary conditions.

There is also provided an electro-magnetic field analysis program of an electric rotating machine for a computer to execute a total electro-magnetic field analysis procedure of analyzing the total electro-magnetic field of the electric rotating machine by assigning a boundary condition to the outer boundary surface of the analysis space and applying a magneto-motive force by current or magnetic force; a procedure of storing the permeability distribution in the magnetic substance obtained in the total electro-magnetic field analysis procedure; a procedure of developing the potential, which describes the electro-magnetic field distribution on the sliding surface between the rotor and stator obtained in the total electro-magnetic field analysis, into multiple higher-harmonic components that have some distribution in the axial direction and a constant or periodic distribution in the direction of rotation; a procedure of accomplishing a linear electro-magnetic field analysis in each rotor space including the rotor and stator space including the stator, wherein the same boundary condition as in the total electro-magnetic field analysis procedure is assigned, a Dirichlet's condition is assigned to the sliding surface, the stored permeability distribution is assigned and fixed to the whole analysis space, and current or magnetic force applied in the total electro-magnetic field analysis procedure is applied; and a procedure of accomplishing a linear electro-magnetic field analysis in each rotor space including the rotor and stator space including the stator, wherein the same boundary condition as in the total electro-magnetic field analysis procedure is assigned, the higher-harmonic components are assigned, one after another, to the sliding surface as the boundary condition, the permeability distribution is assigned to the whole magnetic substance, and current or magnetic force is set zero.

A three-dimensional analysis becomes available if the analysis includes a procedure of developing the potential, which describes the electro-magnetic field distribution on the sliding surface between the rotor and stator obtained in the total electro-magnetic field analysis, into higher-harmonic components that have some distribution in the axial direction and a constant or periodic distribution in the direction of rotation.

It is preferable that, in the case of analyzing a three-dimensional rotating structure, in the procedure of analyzing the electro-magnetic field of the electric rotating machine by assigning a boundary condition to the outer boundary surface of the analysis space and applying a magneto-motive force by current or magnetic force, a procedure of converting a potential obtained under a gage-free or partially gage-free condition into a potential meeting the gage condition is executed before the procedure of developing the potential into multiple higher-harmonic components that have some distribution in the axial direction and a constant or periodic distribution in the direction of rotation.

Diagram showing a flowchart of the electro-magnetic field analysis technique of an electric rotating machine according to the first embodiment of the present invention

Figure 2:
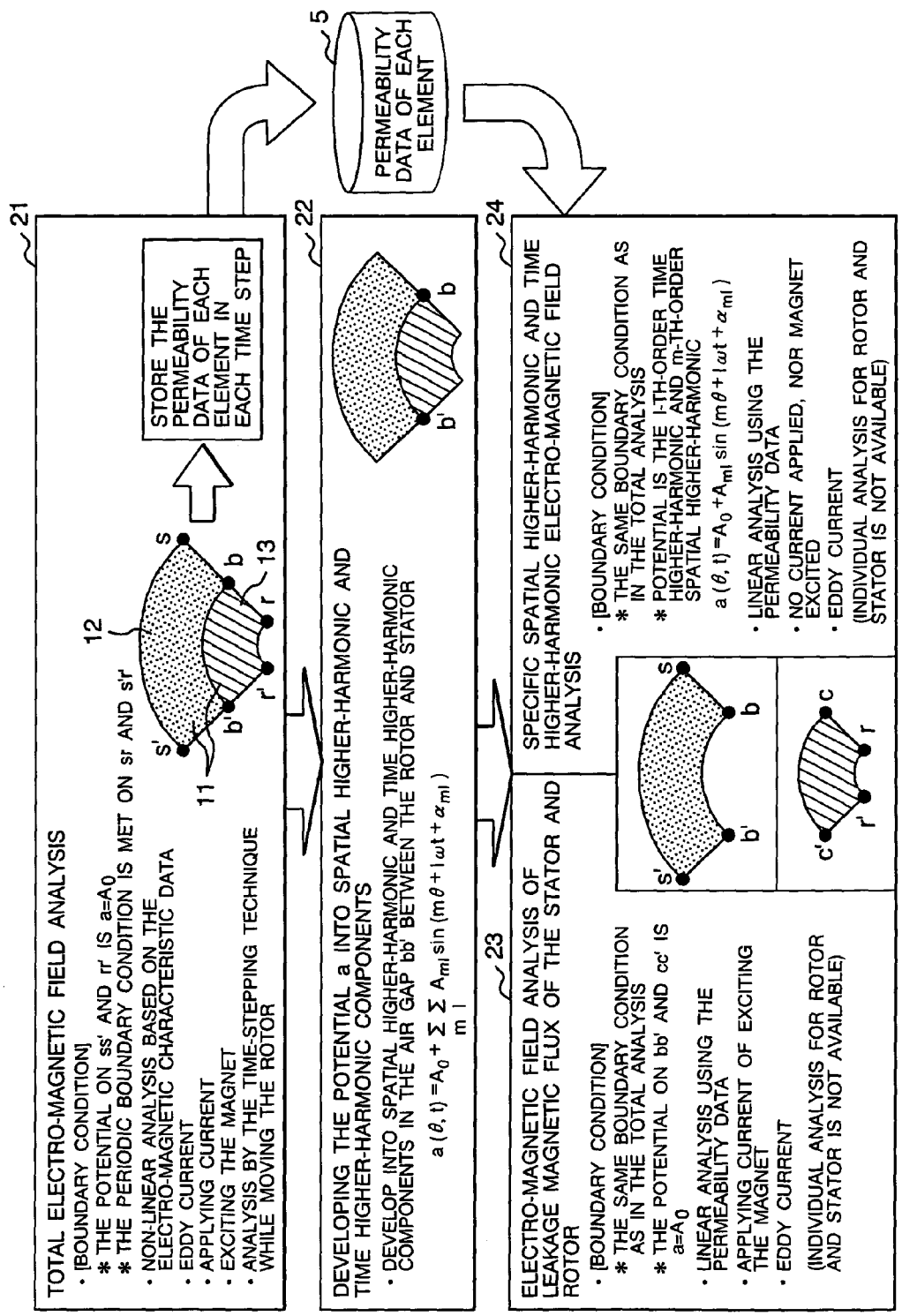

[FIG. 2]
Diagram showing a flowchart of the electro-magnetic field analysis technique of an electric rotating machine according to the second embodiment of the present invention

Figure 3:
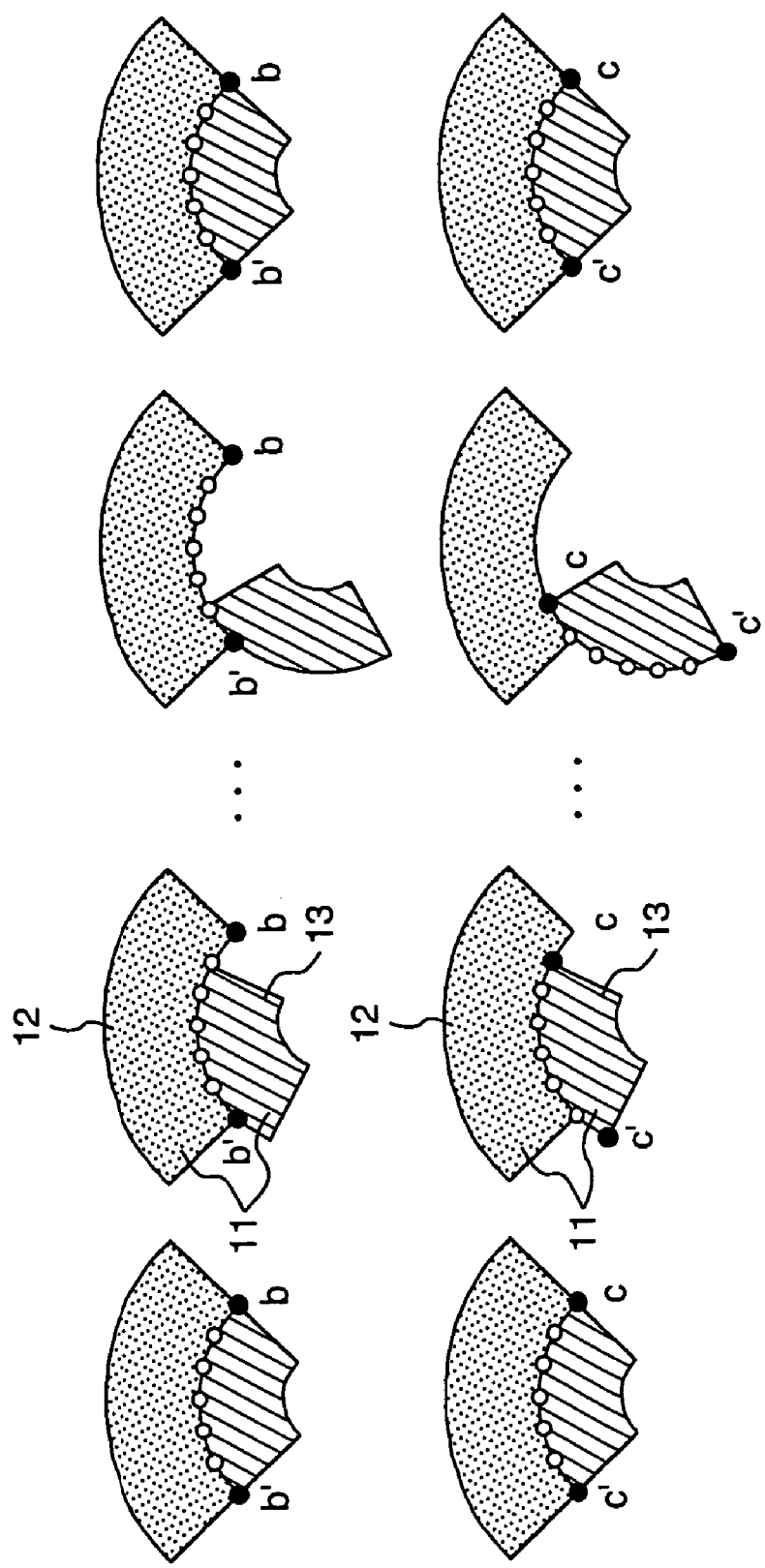

[FIG. 3]
A supplemental explanatory figure of the electro-magnetic field analysis technique according to the embodiment of the present invention

Figure 4:
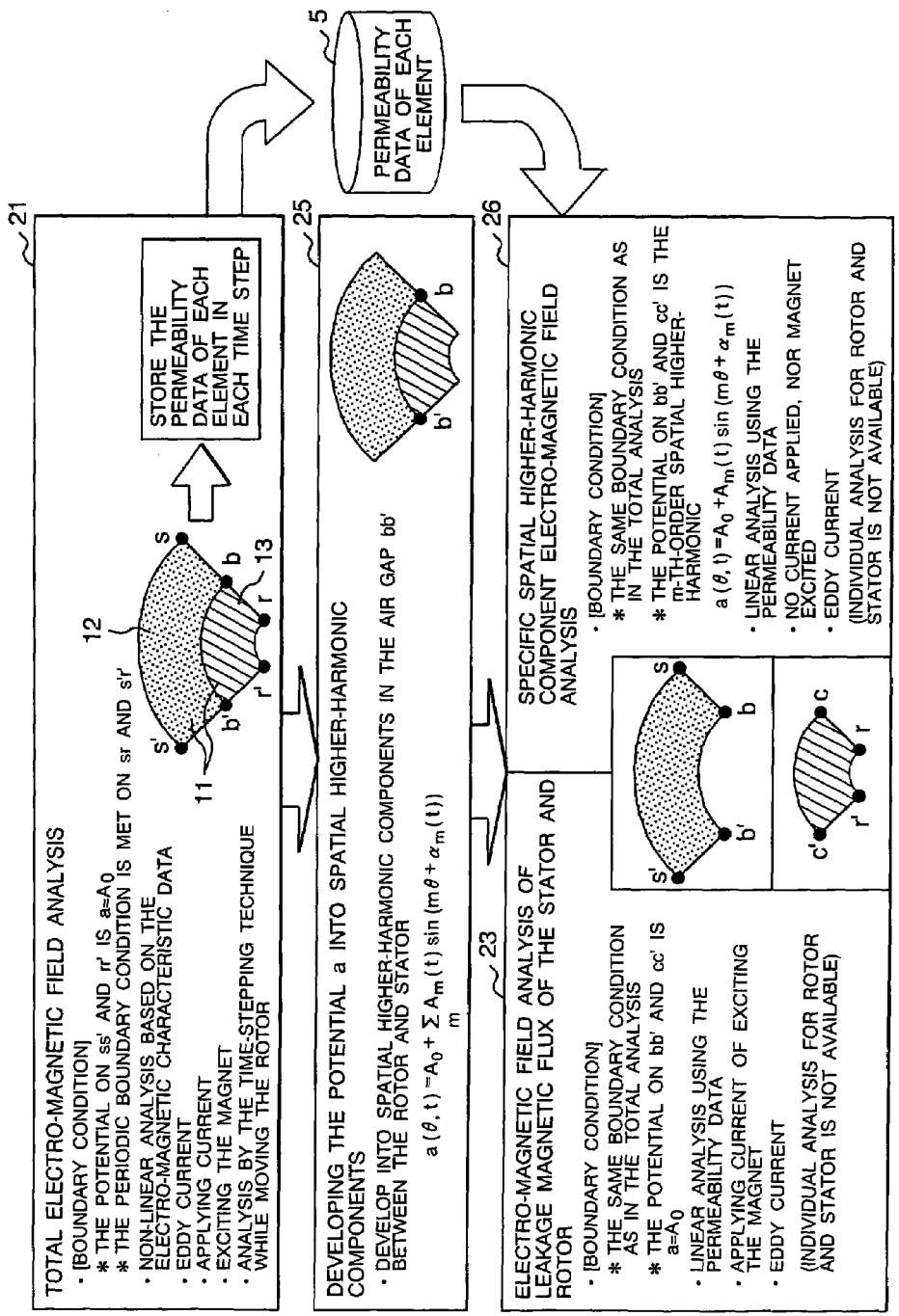

[FIG. 4]
Diagram showing a flowchart of the electro-magnetic field analysis technique of an electric rotating machine according to the third embodiment of the present invention

Figure 5:
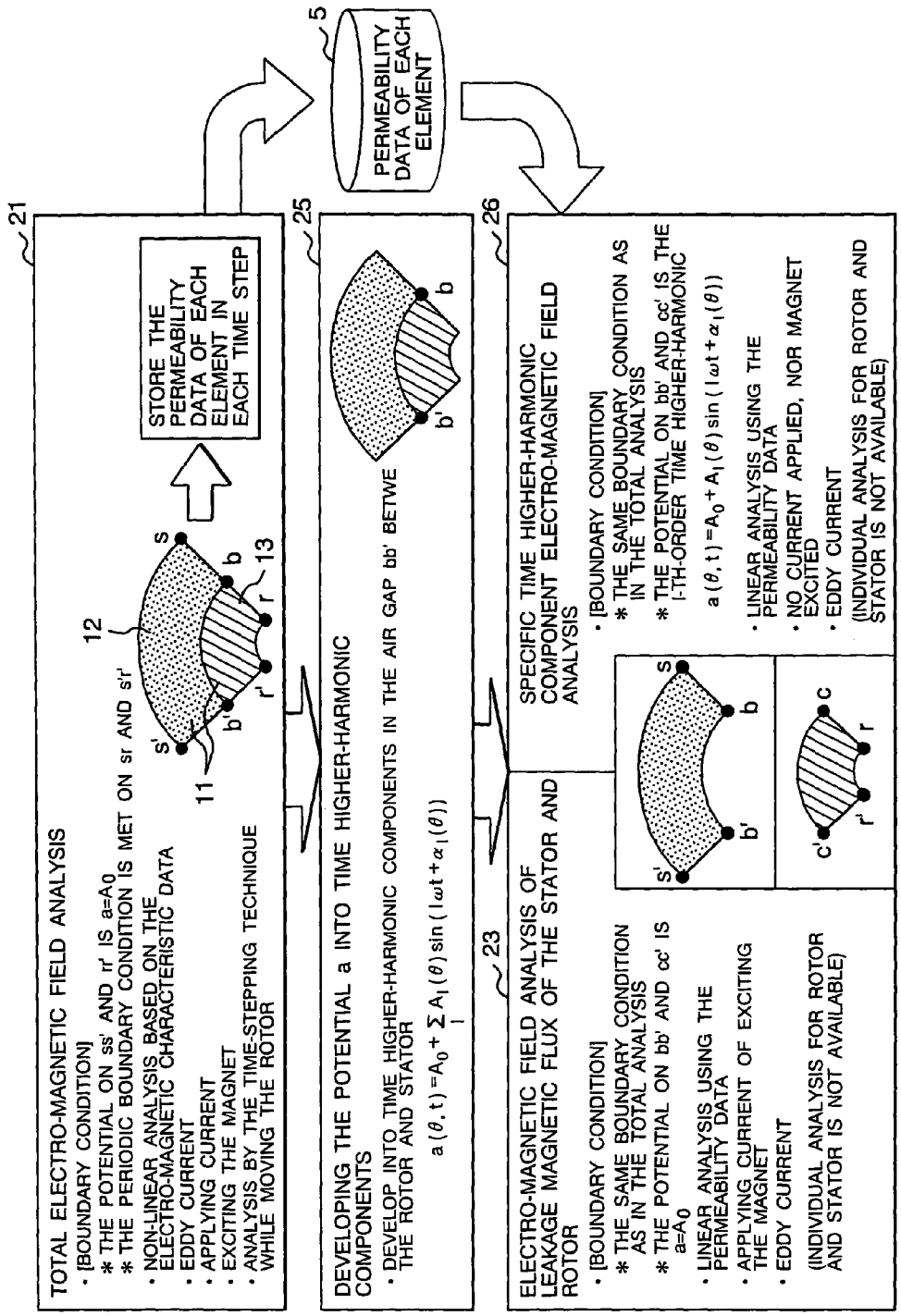

[FIG. 5]
Diagram showing a flowchart of the electro-magnetic field analysis technique of an electric rotating machine according to the fourth embodiment of the present invention

Figure 6:
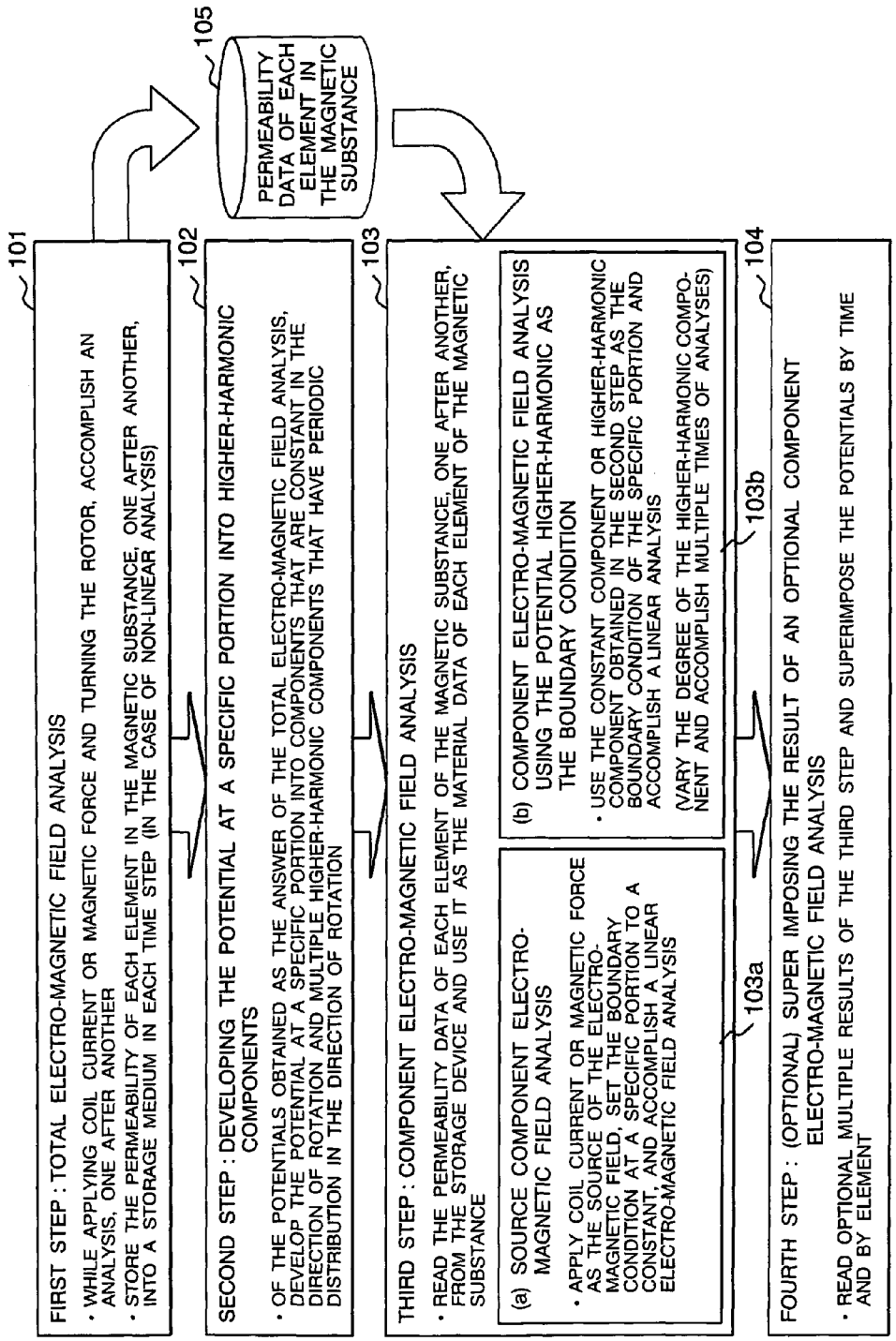

[FIG. 6]
Diagram showing a flowchart of the electro-magnetic field analysis technique of an electric rotating machine according to the fifth embodiment of the present invention

Figure 7:
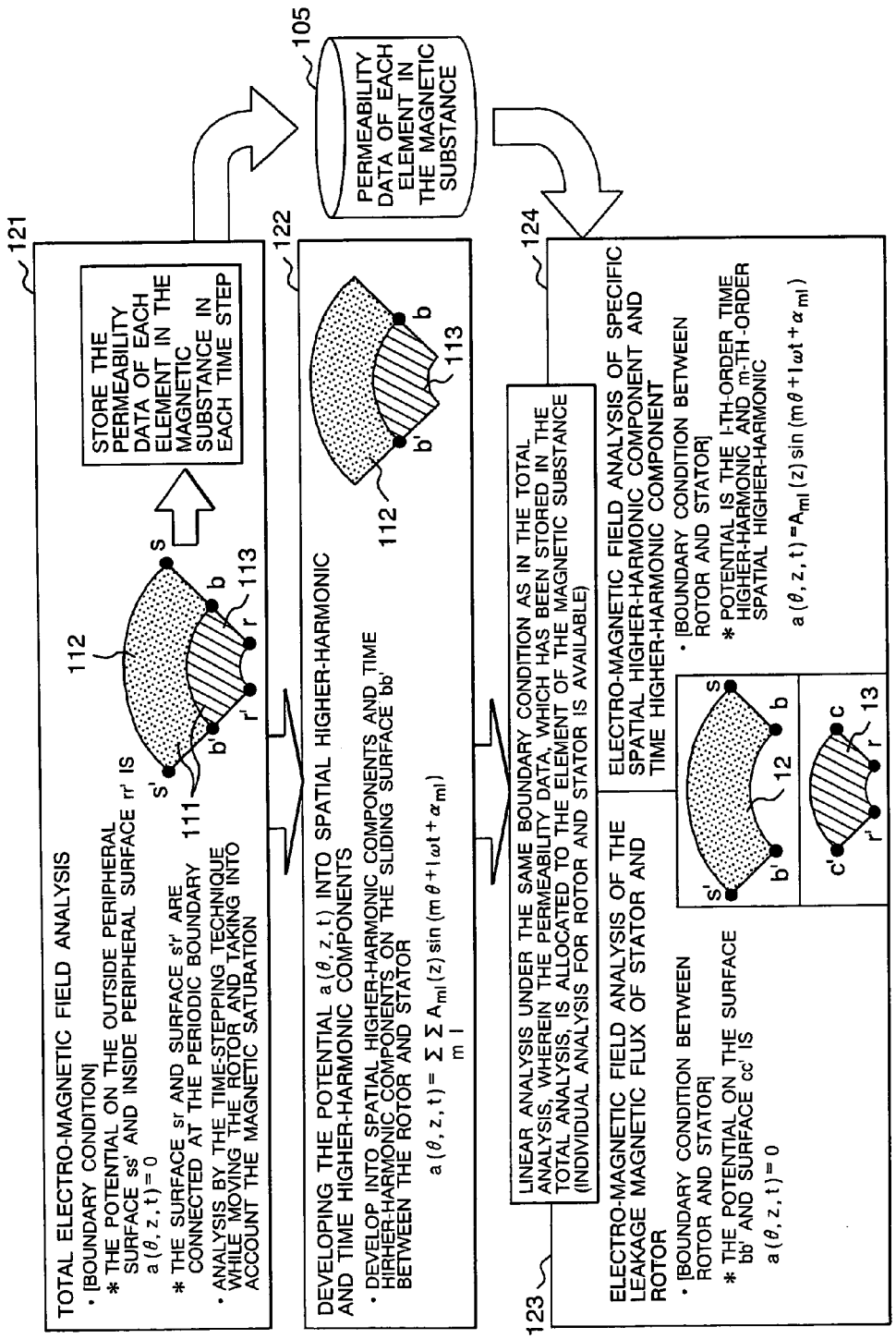

[FIG. 7]
Diagram showing a flowchart of the electro-magnetic field analysis technique of an electric rotating machine according to the sixth embodiment of the present invention

Figure 8:
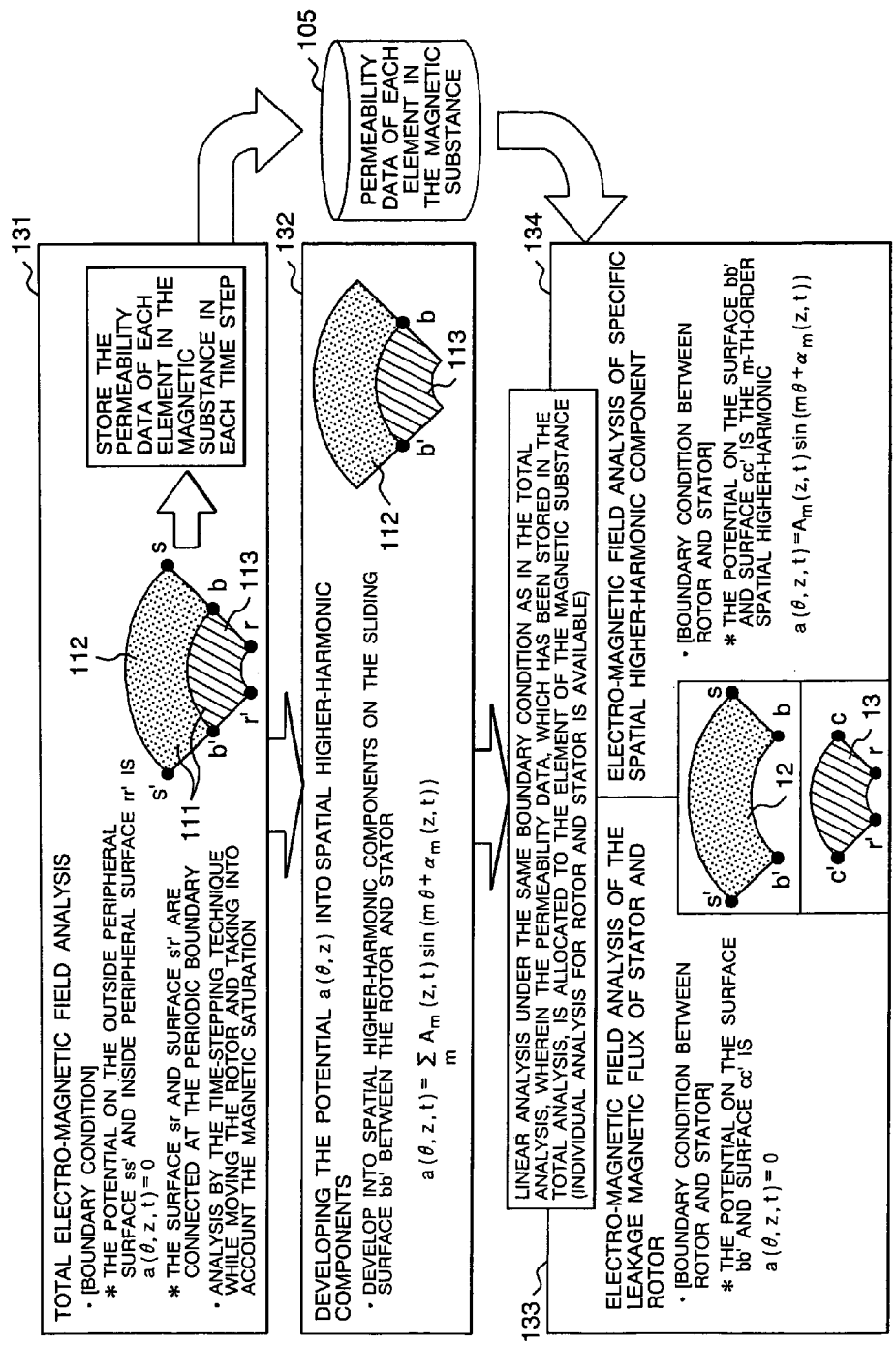

[FIG. 8]
Diagram showing a flowchart of the electro-magnetic field analysis technique of an electric rotating machine according to the seventh embodiment of the present invention

Figure 9:
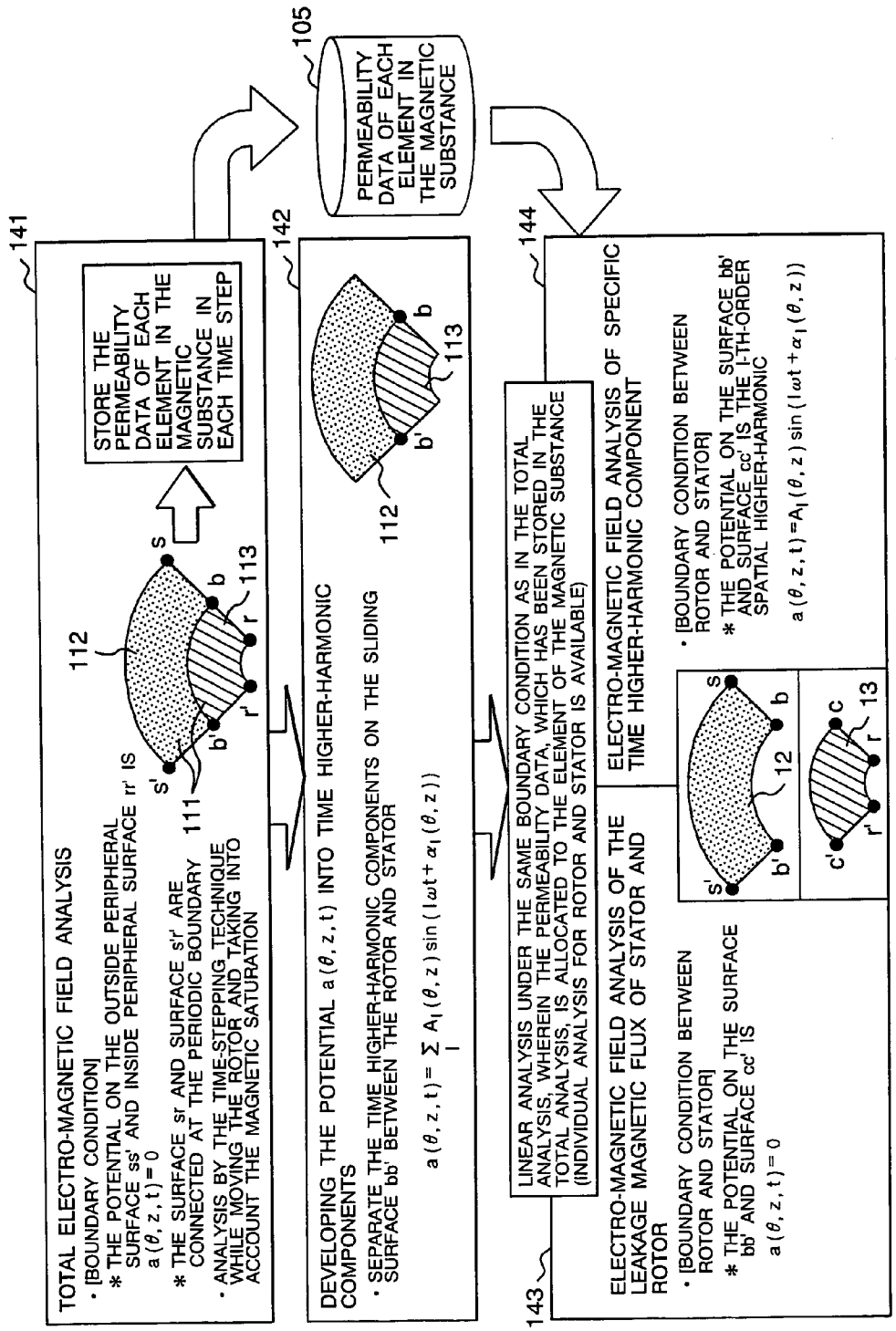

[FIG. 9]
Diagram showing a flowchart of the electro-magnetic field analysis technique of an electric rotating machine according to the eighth embodiment of the present invention

Figure 10:
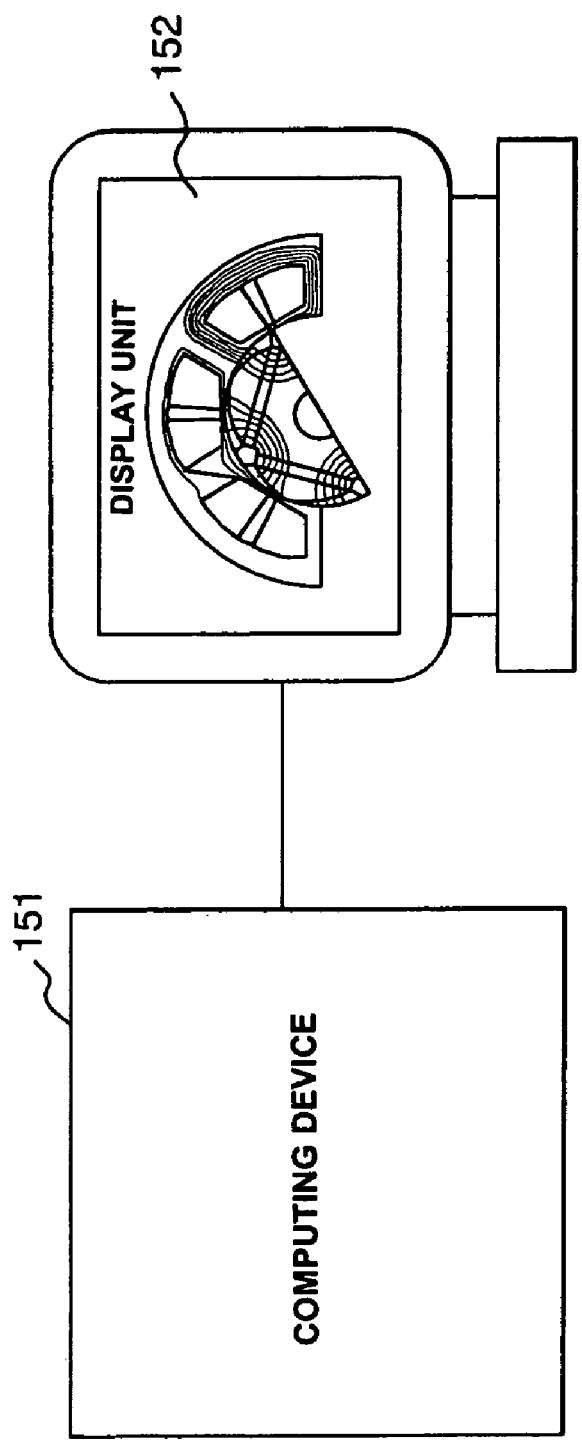

[FIG. 10]
Figure showing a device on which the electro-magnetic field analysis of an electric rotating machine of the present invention is accomplished

DETAILED DESCRIPTION OF THE INVENTION

Description of the Preferred Embodiments

In this specification, higher-harmonic includes constant component and fundamental as well.

Figure 1:
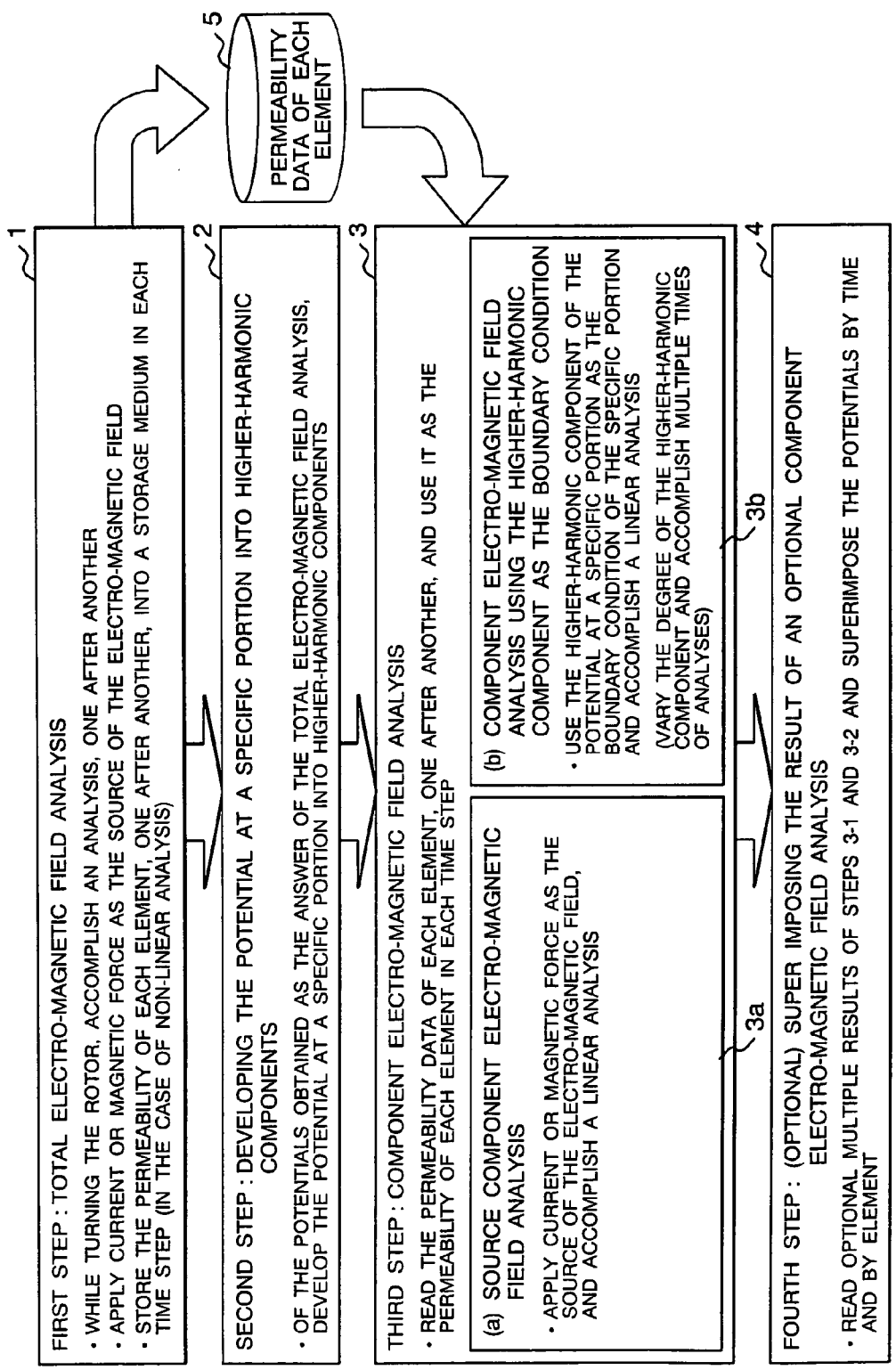
[FIG. 1]

The electro-magnetic field analysis technique of an electric rotating machine according to the present invention is described hereunder, using figures. To start with, the electro-magnetic field analysis technique according to the first embodiment of the present invention is described hereunder, using FIG. 1. As shown in FIG. 1, with the electro-magnetic field analysis technique according to this embodiment, a total electro-magnetic field analysis 1 based on a prior art is accomplished in the first step. In this step, an analysis is accomplished, one after another, by the time-stepping technique while turning the rotor at the number of revolutions specified as a computation condition. A magneto-motive force by current or magnet is applied as the source of the electro-magnetic field. In the case of non-linear analysis with consideration given to non-linear electro-magnetic characteristic, the permeability data 5 of each element is saved or stored in each time step. In the second step, of the potentials obtained through the analysis in the first step, higher-harmonic development 2 of the potential at a specific portion is accomplished. While higher-harmonic includes the spatial higher-harmonic contained in spatial distribution and the time higher-harmonic contained in time change, this step includes a case of developing (separating) either one of them and a case of developing both of them. Concrete techniques of developing into higher-harmonic components include the well-known Fourier transformation (Fourier development) and Wavelet transformation.

A component electro-magnetic field analysis 3 is accomplished in the third step. The component electro-magnetic field analysis 3 comprises a source component electro-magnetic field analysis 3a and a component electro-magnetic field analysis 3b using the potential higher-harmonic as the boundary condition. In the component electro-magnetic field analysis 3, the permeability data 5 of each element obtained in the total analysis 1 is read and assigned in each time step as the permeability of each element. In the source component electro-magnetic field analysis 3a, a linear analysis is accomplished by applying current or magnetic force as the source of the electro-magnetic field. In this analysis, it is allowable to accomplish a single electro-magnetic field analysis by applying the same current or magnetic force itself as applied in the total electro-magnetic field analysis 1 or accomplish multiple electro-magnetic field analyses by applying each current or magnetic force component, which is so separated that the sum of the components is equal to the current or magnetic force applied in the total electro-magnetic field analysis 1.

In the component electro-magnetic field analysis 3b using the potential higher-harmonic as the boundary condition, the electro-magnetic field is analyzed by assigning the higher-harmonic component of the potential, obtained in the higher-harmonic development 2 of the potential at a specific portion, as the boundary condition on the specific portion. Since multiple higher-harmonic components are obtained, the component electro-magnetic field analysis 3b is accomplished multiple times for the multiple higher-harmonic components. The fourth step is superimposition 4 of the result of an optional component electro-magnetic field analysis, and can be accomplished optionally when the electro-magnetic field distribution comprising multiple specific higher-harmonic components is needed.

FIG. 2 shows a flowchart of the electro-magnetic field analysis according to the second embodiment of the present invention, and FIG. 3 is a supplemental explanatory figure of the electro-magnetic field analysis of this embodiment. As shown in FIG. 2, the total analysis space 11 comprises an outside peripheral analysis space 12 and inside peripheral analysis space 13, and, with the electro-magnetic field analysis technique of this embodiment, the electro-magnetic field is developed (separated) into both spatial higher-harmonic and time higher-harmonic. Description below is made on an assumption that the total analysis space 11 is a two-dimensional space on a cross-section in the axial direction and the variable for the electro-magnetic field analysis is an axial component of the magnetic vector potential. The outside peripheral analysis space 12 and inside peripheral analysis space 13 represent either the stator side and rotor side, respectively, or the rotor side and stator side, respectively. The arc bb' that makes the boundary between the outside peripheral analysis space 12 and inside peripheral analysis space 13 is located in the air gap between the stator and rotor.

The procedure of the total electro-magnetic field analysis 21 is described hereunder. In the total analysis, the boundary condition of the total analysis space 11 is so specified that, when the potential on the outside peripheral arc ss' and inside peripheral arc rr' is given by Formula (1), the periodic boundary condition is met each other on the boundary sr and s'r' on each circumferential end.

[Formula 1]

$$a(\theta,t)=A_0 \quad (1)$$

If the total analysis space 11 is given as a complete round analysis area, no periodic boundary condition is used. Nonlinear analysis based on the electro-magnetic characteristic data is employed, wherein current or magnetic force is inputted as the electro-magnetic field source and an analysis by the time-stepping technique is accomplished, one after another, while moving the rotor on the arc bb'. If the total analysis space 11 contains any conductor, conductivity may be inputted to analyze eddy current. Besides, the above analysis may be a linear analysis using a constant permeability or an analysis without paying any consideration to the eddy current. In this step, the permeability of each element at each time is saved in the permeability data 5 of each element.

In the spatial higher-harmonic and time higher-harmonic analysis 22 of the potential a, the potential on the arc bb' obtained in the total electro-magnetic field analysis 21 is developed into spatial higher-harmonic and time higher-harmonic components as in Formula (2).

[Formula 2]

$$a(\theta, t) = A_0 + \sum_m \sum_l A_{ml} \sin(m_\theta + 1_\omega t + \alpha_{ml}) \quad (2)$$

When the arc bb', on which the higher-harmonic component of the potential a is developed, is moved on an assumption that the inside peripheral analysis space 13 represents the rotor, two ways of analysis are available as shown in FIG. 3: one where the arc bb' is fixed on a static coordinate system an the other where the arc cc' is fixed on a rotary coordinate system. However, because a static coordinate system can be transformed into a rotary coordinate system by coordinate transformation, either way can be employed. In other words, development on the arc bb' on a static coordinate system can be transformed into development on the arc cc' on a rotary coordinate system or analysis on the arc cc' on a rotary coordinate system can be transformed into analysis on the arc bb' on a static coordinate system.

Next, an electro-magnetic field analysis 23 of leakage magnetic flux of the rotor and stator is accomplished. In the electro-magnetic field analysis 23 of leakage magnetic flux of the rotor and stator, the permeability database 5 of each element, obtained in the total electro-magnetic field analysis 21, is read and assigned in each time step as the permeability of each element. As in the total electro-magnetic field analysis 21, the boundary condition is so specified that, when the potential on the outside peripheral arc ss' and inside peripheral arc rr' of the total analysis space 11 is given by Formula (1), the periodic boundary condition is met each other on the boundary sr and s'r' on each circumferential end. In addition, a boundary condition given by Formula (3), similar to Formula (1), is so specified on the arc bb' of the outside peripheral analysis space 12 and arc cc' on the inside peripheral analysis space 13 that nothing but leakage magnetic flux is generated in the outside peripheral analysis space 12 and inside peripheral analysis space 13.

[Formula 3]

$$a(\theta,t)=A_0 \quad (3)$$

The same current or magnetic force as applied in the total electro-magnetic field analysis 21 is applied as the source of the electro-magnetic field and a linear analysis is accomplished. If a conductivity is specified in the total electro-magnetic field analysis 21 to compute eddy current, a similar conductivity can be specified and an analysis with consideration given to the eddy current is accomplished. In this analysis, it is allowable to accomplish a single electro-magnetic field analysis by applying the same current or magnetic force itself as applied in the total electro-magnetic field analysis 1 or accomplish multiple electro-magnetic field analyses by applying each current or magnetic force component, which is so separated that the sum of the components is equal to the current or magnetic force applied in the total electro-magnetic field analysis 1. In this electro-magnetic field analysis 23 of leakage magnetic flux of the rotor and stator, because the boundary condition given by the above Formula (3) is assigned on the arc bb' and arc cc' each of which makes the boundary between the outside peripheral analysis space 12 and inside peripheral analysis space 13, it is possible to analyze the outside peripheral analysis space 12 and inside peripheral analysis space 13 separately.

In parallel with the electro-magnetic field analysis 23 of leakage magnetic flux of the rotor and stator, a specific spatial higher-harmonic and time higher-harmonic electro-magnetic field analysis 24 is accomplished. In the specific spatial higher-harmonic and time higher-harmonic electro-magnetic field analysis 24, as in the electro-magnetic field analysis 23 of leakage magnetic flux of the rotor and stator, the permeability data 5 of each element, obtained in the total electro-magnetic field analysis 21, is read and assigned in each time step as the permeability of each element. Similarly to the electro-magnetic field analysis 23 of leakage magnetic flux of the rotor and stator, and also to the total electro-magnetic field analysis 21, the boundary condition is so specified that, when the potential on the outside peripheral arc ss' and inside peripheral arc rr' of the total analysis space 11 is given by Formula (1), the periodic boundary condition is met each other on the boundary sr and s'r' on each circumferential end. Differently from the electro-magnetic field analysis 23 of leakage magnetic flux of the rotor and stator, the boundary condition given by Formula (4), which is solely the specific m-th-order spatial higher-harmonic and l-th-order time higher-harmonic extracted from the potentials analyzed by Formula (2), is assigned on the arc bb' of the outside peripheral analysis space 12 and arc cc' of the inside peripheral analysis space 13.

[Formula 4]

$$a(\theta,t)=A_0+A_{ml}\sin(m\theta+1\omega t+\alpha_{ml}) \quad (4)$$

The current or magnetic force as applied in the total electro-magnetic field analysis 21 is no longer applied as the source of the electro-magnetic field and a linear analysis is accomplished. If a conductivity is specified in the total electro-magnetic field analysis 21 to compute eddy current, a similar conductivity can be specified and an analysis with consideration given to the eddy current is accomplished. Although the number of order of the spatial higher-harmonic on the arc bb' differs from that on the arc cc', this does not cause a problem because the development on one arc can be that on the other arc by means of coordinate transformation between the static coordinate system and rotary coordinate system.

In the specific spatial higher-harmonic and time higher-harmonic electro-magnetic field analysis 24, as in the electro-magnetic field analysis 23 of leakage magnetic flux of the rotor and stator, because the boundary condition given by Formula (3) is assigned on each arc bb' and arc cc', each of which makes the boundary between the outside peripheral analysis space 12 and inside peripheral analysis space 13, the outside peripheral analysis space 12 and inside peripheral analysis space 13 can be analyzed separately.

Besides, the electro-magnetic field analysis 23 of leakage magnetic flux of the rotor and stator and the specific spatial higher-harmonic and time higher-harmonic electro-magnetic field analysis 24 can be accomplished optionally in random sequence, and the specific m-th-order spatial higher-harmonic and l-th-order spatial higher-harmonic in the specific spatial higher-harmonic and time higher-harmonic electro-magnetic field analysis 24 can be analyzed only with consideration given to the number of order needed by the analyzer.

FIG. 4 shows a flowchart of the electro-magnetic field analysis according to the third embodiment of the present invention. The analysis in FIG. 4 differs from that in FIG. 2 in a point that the higher-harmonic handled by the analysis is spatial higher-harmonic only. The total electro-magnetic field analysis 21 is the same as in FIG. 2 and the permeability data of each element is similarly saved. In the spatial higher-harmonic component analysis 25 of the potential a, the potential on the arc bb', obtained in the total electro-magnetic field analysis 21, is developed into spatial higher-harmonic components as given by Formula (5).

[Formula 5] (5)

$$a(\theta, t) = A_0 + \sum_m A_m(t)\sin(m\theta + \alpha_{ml}(t))$$

The electro-magnetic field analysis 23 of leakage magnetic flux of the rotor and stator is the same as in FIG. 2.

In the specific spatial higher-harmonic electro-magnetic field analysis 26, the permeability data 5 of each element obtained in the total electro-magnetic field analysis 21 is read and assigned in each time step as the permeability of each element. The boundary condition is so specified that, when the potential on the outside peripheral arc ss' and inside peripheral arc rr' of the total analysis space 11 is given by Formula (1), similarly as in FIG. 2, the periodic boundary condition is met each other on the boundary sr and s'r' on each circumferential end. The boundary condition given by Formula (6), which is solely the specific m-th-order spatial higher-harmonic extracted from the potentials analyzed by Formula (5), is assigned on the arc bb' of the outside peripheral analysis space 12 and arc cc' of the inside peripheral analysis space 13.

[Formula 6]

$$a(\theta,t)=A_0+A_m(t)\sin(m\theta+\alpha_{ml}(t)) \quad (6)$$

The current or magnetic force as applied in the total electro-magnetic field analysis 21 is no longer applied as the source of the electro-magnetic field and a linear analysis is accomplished. If a conductivity is specified in the total electro-magnetic field analysis 21 to compute eddy current, a similar conductivity can be specified and an analysis with consideration given to the eddy current is accomplished. And then, only the electro-magnetic field distribution of the specific spatial higher-harmonic obtained through the analysis is displayed on a displaying means. According to this embodiment, where the electro-magnetic field distribution of specific spatial higher-harmonic is displayed to the designer of an electric rotating machine, the designer can obtain information useful for analyzing the causes of generated vibration or noise.

FIG. 5 shows a flowchart of the electro-magnetic field analysis according to the fourth embodiment of the present invention. The analysis in FIG. 5 differs from that in FIG. 2 in a point that the higher-harmonic handled by the analysis is time higher-harmonic only. The total electro-magnetic field analysis 21 is the same as in FIG. 2 and the permeability data 5 of each element is similarly saved. In the time higher-harmonic component analysis 25 of the potential a, the potential on the arc bb', obtained in the total electro-magnetic field analysis 21, is developed into time higher-harmonic components as given by Formula (7).

[Formula 7] (7)

$$a(\theta, t) = A_0 + \sum_l A_1(\theta)\sin(l\omega t + \alpha_{ml}(\theta))$$

The electro-magnetic field analysis 23 of leakage magnetic flux of the rotor and stator is the same as in FIG. 2.

In the specific time higher-harmonic electro-magnetic field analysis 26, the permeability data 5 of each element obtained in the total electro-magnetic field analysis 21 is read and assigned in each time step as the permeability of each element. The boundary condition is so specified that, when the potential on the outside peripheral arc ss' and inside peripheral arc rr' of the total analysis space 11 is given by Formula (1), similarly as in FIG. 2, the periodic boundary condition is met each other on the boundary sr and s'r' on each circumferential end. The boundary condition given by Formula (8), which is solely specific l-th-order time higher-harmonic extracted from the potentials analyzed by Formula (7), is assigned on the arc bb' of the outside peripheral analysis space 12 and arc cc' of the inside peripheral analysis space 13.

[Formula 8]

$$a(\theta,t)=A_0+A_1(\theta)\sin(l\omega t+\alpha_{ml}(\theta)) \quad (8)$$

The current or magnetic force as applied in the total electro-magnetic field analysis 21 is no longer applied as the source of the electro-magnetic field and a linear analysis is accomplished. If a conductivity is specified in the total electro-magnetic field analysis 21 to compute eddy current, a similar conductivity can be specified and an analysis with consideration given to the eddy current is accomplished. And then, only the electro-magnetic field distribution of the specific time higher-harmonic obtained through the analysis is displayed on a displaying means.

According to this embodiment, where the electro-magnetic field distribution of specific spatial higher-harmonic is displayed to the designer of an electric rotating machine, the designer can obtain information useful for analyzing the causes of generated vibration or noise.

Next, a three-dimensional analysis technique for expanding the electro-magnetic field analysis into three-dimension is described hereunder. FIG. 6 shows a flowchart of the electro-magnetic field analysis according to the fifth embodiment of the present invention. A total electro-magnetic field analysis 101 based on a prior art is accomplished in the first step. In this step, a magneto-motive force by current or magnet is applied and an analysis is accomplished, one after another, by the time-stepping technique while turning the rotor at the number of revolutions specified as a computation condition. In the case of non-linear analysis with consideration given to non-linear electro-magnetic characteristic, the permeability data 105 of each element of the magnetic substance is stored and saved in each time step. In the second step, of the potentials obtained through the analysis in the first step, higher-harmonic development 102 of the potential at a specific portion is accomplished. In this step, either one of spatial higher-harmonic and time higher-harmonic can be developed or both can be developed.

A component electro-magnetic field analysis 103 is accomplished in the third step. The component electro-magnetic field analysis 103 comprises a source component electro-magnetic field analysis 103a and a component electro-magnetic field analysis 103b using the potential higher-harmonic as the boundary condition. In the component electro-magnetic field analysis 103, the permeability data 105 of each element in the magnetic substance in each time step obtained in the total analysis 101 is fixed and assigned as the permeability of each element in the magnetic substance, and then a linear electro-magnetic field analysis is accomplished.

In the source component electro-magnetic field analysis 103a, a linear analysis is accomplished by applying at least either current or magnetic force as the source of the electro-magnetic field. In this analysis, it is allowable to accomplish a single electro-magnetic field analysis by applying the same current or magnetic force itself as applied in the total electro-magnetic field analysis 101 or accomplish individual electro-magnetic field analysis by applying each current or magnetic force component, which is so separated that the sum of the components is equal to the current or magnetic force applied in the total electro-magnetic field analysis 101. In order to expand the analysis to three-dimension, in the component electro-magnetic field analysis 103b using the potential higher-harmonic as the boundary condition, the electro-magnetic field is analyzed by assigning the constant component in terms of the direction of rotation (a component that has some distribution in the axial direction and is a constant in the direction of rotation) or higher-harmonic component (multiple spatial higher-harmonic mode components that have some distribution in the axial direction and a periodic distribution in the direction or rotation), obtained in the higher-harmonic analysis 102 of the potential at a specific portion, as the boundary condition on the same specific portion, and coil current or magnetic force is all set zero. Since multiple higher-harmonic components are obtained, the component electro-magnetic field analysis 103b is accomplished multiple times for the multiple higher-harmonic components. The fourth step is superimposition 104 of the result of an optional component electro-magnetic field analysis, and can be accomplished optionally when the electro-magnetic field distribution comprising multiple specific higher-harmonic components is needed.

FIG. 7 shows a flowchart of the electro-magnetic field analysis of an electric rotating machine according to the sixth embodiment of the present invention. As shown in FIG. 7, the total analysis space 111 comprises an outside peripheral analysis space 112 and inside peripheral analysis space 113, and the electro-magnetic field is developed into both spatial higher-harmonic and time higher-harmonic. Description below is made on an assumption that the total analysis space 111 is a two-dimensional space in a cross-section perpendicular to the axial direction and the variable for the electro-magnetic field analysis is, for example, an integral value a of the projection of a magnetic vector potential, placed on a side on each element, onto the side in the side element finite element method. Since it is a potential that is processed in the analysis, it is needless to say that the integral value can be replaced with the variable a which is obtained by adding a constant vector evenly to the potential described in the following embodiment and calculating the sum by a curvilinear integral on the side.

In the description below, for the sake of easier understanding, a Dirichlet's condition of a=0, under which the electro-magnetic field lies in parallel with the boundary surface, is specified as the boundary condition of the boundary, except for the periodic boundary, on the outside peripheral surface in the total analysis space. The normal Dirichlet's condition of an outside peripheral surface, where the electro-magnetic field intensity is low, is frequently set to a=0 as above. The outside peripheral analysis space 112 and inside peripheral analysis space 113 represent either the stator side and rotor side, respectively, or the rotor side and stator side, respectively. The sliding surface bb' that makes the boundary between the outside peripheral analysis space 112 and inside peripheral analysis space 113 is located in the air gap between the stator and rotor. The procedure of the total electro-magnetic field analysis 121 is described hereunder. In the total analysis, the boundary condition of the total analysis space 111 is so specified that, when the potential on the outside peripheral surface ss' and inside peripheral surface rr' is set 0, the boundary sr and s'r' on each circumferential end are connected to each other under the periodic boundary condition.

Non-linear analysis based on the electro-magnetic characteristic data is employed, wherein current or magnetic force is inputted as the electro-magnetic field source and an analysis by the time-stepping technique is accomplished, one after another, while turning the rotor on the sliding surface bb'. If the total analysis space 111 contains any conductor, conductivity may be inputted to analyze eddy current. Besides, the above analysis may be a linear analysis using a time-wise constant permeability or an analysis without paying any consideration to the eddy current. In this step, the permeability of each element of the magnetic substance at each time is saved in the permeability data 105. In the spatial higher-harmonic and time higher-harmonic component development 122 of the potential a, the potential on the sliding surface bb' obtained in the total electro-magnetic field analysis 121 is developed into spatial higher-harmonic and time higher-harmonic components as in Formula (9).

[Formula 9]

$$a(\theta, z, t) = \sum_m \sum_l A_{ml}(z)\sin(m\theta + 1_\omega t + \alpha_{ml})$$

(9)

The development into components may be accomplished either on a static coordinate system or on a rotary coordinate system on the rotor.

Next, an electro-magnetic field analysis 123 of leakage magnetic flux of the rotor and stator is accomplished. In the electro-magnetic field analysis 123 of leakage magnetic flux of the rotor and stator, the permeability data 105 of each element in the magnetic substance, obtained in the total electro-magnetic field analysis 121, is assigned to each element in the magnetic substance in each time step. As in the total electro-magnetic field analysis 121, the boundary condition is so specified that, when the potential on the outside peripheral surface ss' and inside peripheral surface rr' of the total analysis space 111 is set 0, the boundary surface sr and s'r' on each circumferential end are connected to each other under the periodic boundary condition. In addition, the potential on the sliding surface bb' of the outside peripheral analysis space 112 and sliding surface cc' on the inside peripheral analysis space 113 is set 0, as on the outside peripheral surface ss' and inside peripheral surface rr', so that nothing but leakage magnetic flux is generated in the outside peripheral analysis space 112 and inside peripheral analysis space 113. The same current or magnetic force as applied in the total electro-magnetic field analysis 121 is applied as the source of the electro-magnetic field and a non-linear analysis is accomplished. If a conductivity is specified in the total electro-magnetic field analysis 121 to compute eddy current, a similar conductivity can be specified and an analysis with consideration given to the eddy current is accomplished. In this analysis, it is allowable to accomplish a single electro-magnetic field analysis by applying the same current or magnetic force itself as applied in the total electro-magnetic field analysis 121 or accomplish multiple electro-magnetic field analyses by applying each current or magnetic force component, which is so separated that the sum of the components is equal to the current or magnetic force applied in the total electro-magnetic field analysis 121.

In this electro-magnetic field analysis 123 of leakage magnetic flux of the rotor and stator, because the boundary condition on the sliding surface bb' and sliding surface cc' each of which makes the boundary between the outside peripheral analysis space 112 and inside peripheral analysis space 113 is set 0, it is possible to analyze the outside peripheral analysis space 112 and inside peripheral analysis space 113 separately. Independently from the electro-magnetic field analysis 123 of leakage magnetic flux of the rotor and stator, a specific spatial higher-harmonic and time higher-harmonic electro-magnetic field analysis 124 is accomplished. In the specific spatial higher-harmonic and time higher-harmonic electro-magnetic field analysis 124, as in the electro-magnetic field analysis 123 of leakage magnetic flux of the rotor and stator, the permeability data 105 of each element in the magnetic substance, obtained in the total electro-magnetic field analysis 121, is assigned to each element in the magnetic substance in each time step. Similarly to the electro-magnetic field analysis 123 of leakage magnetic flux of the rotor and stator, and also to the total electro-magnetic field analysis 121, the boundary condition is set 0 on the outside peripheral surface ss' and inside peripheral surface rr' of the total analysis space 111, and the boundary sr and s'r' on each circumferential end are connected to each other under the periodic boundary condition. Differently from the electro-magnetic field analysis 123 of leakage magnetic flux of the rotor and stator, the boundary condition given by Formula (10), which is solely the specific m-th-order spatial higher-harmonic and l-th-order time higher-harmonic extracted from the potentials analyzed by Formula (9), is assigned on the sliding surface bb' of the outside peripheral analysis space 112 and sliding surface cc' of the inside peripheral analysis space 113.

[Formula 10]

$$a(\theta, z, t) = A_{ml}(z)\sin(m\theta + l\omega t + \alpha_{ml}) \quad (10)$$

If the outside peripheral analysis space 112 represents the stator, Formula (2) defying the boundary condition of the sliding surface bb' is employed on a static coordinate system and, if the outside peripheral analysis space 112 represents the rotor, it is employed on a rotary coordinate system. Similarly, if the inside peripheral analysis space 113 represents the stator, Formula (10) defying the boundary condition of the sliding surface cc' is employed on a static coordinate system and, if the outside peripheral analysis space 113 represents the rotor, it is used on a rotary coordinate system. After the above is complete, the current or magnetic force as applied in the total electro-magnetic field analysis 121 is no longer applied as the source of the electro-magnetic field and a linear analysis is accomplished. If a conductivity is specified in the total electro-magnetic field analysis 121 to compute eddy current, a similar conductivity can be specified and an analysis with consideration given to the eddy current is accomplished.

In the specific spatial higher-harmonic and time higher-harmonic electro-magnetic field analysis 124, because the boundary condition given by Formula (10) is assigned on each sliding surface bb' and sliding surface cc', each of which makes the boundary between the outside peripheral analysis space 112 and inside peripheral analysis space 113, the outside peripheral analysis space 112 and inside peripheral analysis space 113 can be analyzed separately. Besides, the electro-magnetic field analysis 123 of leakage magnetic flux of the rotor and stator and the specific spatial higher-harmonic and time higher-harmonic electro-magnetic field analysis 124 can be accomplished optionally in random sequence, and the specific m-th-order spatial higher-harmonic and l-th-order time higher-harmonic in the specific spatial higher-harmonic and time higher-harmonic electro-magnetic field analysis 124 can be analyzed only with consideration given to the number of order needed by the analyzer.

Although the analysis using the magnetic vector potential A has been described herein, the Coulomb gage given by Formula (11) automatically holds true for an analysis of two-dimensional space.

[Formula 11]

$$\text{div}A = 0 \quad (11)$$

For an analysis of three-dimensional space, however, it is generally preferable not to fix the gage (divA) but to compute under a gage-free or partially gage-free condition for higher-speed analysis. When the magnetic vector potential A is analyzed, one after another, in time steps, divA fluctuates in each time step because of the above reason, which in turn causes a problem in the case where a physical variable related to the magnetic vector potential A is developed into time higher-harmonic components. To avoid this, it is preferable that the obtained magnetic vector potential A is converted into the magnetic vector potential A' processed through the Coulomb gage, using Formula (12), in each time step.

[Formula 12]

$$A' = A - \text{grad}\Psi \quad (12)$$

The scalar potential $\Psi$ for the above can be obtained from Formula (13).

[Formula 13]

$$\nabla^2 \psi = \text{div}A \quad (13)$$

If a new variable a' given by Formula (14) is used, instead of the variable a, for the scalar potential $\Psi$ obtained as above on each nodal point, the problem due to the fluctuation of the gage is eliminated.

[Formula 14]

$$a' = a - (\psi_2 - \psi_1) \quad (14)$$

$\Psi_1$ and $\Psi_2$ above are the values of the scalar potential $\Psi$ on the nodal points, equivalent to the start point and end point, respectively, on the side in the curvilinear integral of the magnetic vector potential A in defining the variable a.

FIG. 8 shows a flowchart of the electro-magnetic field analysis according to the seventh embodiment of the present invention. The analysis in FIG. 8 differs from that in FIG. 7 in a point that the higher-harmonic handled by the analysis is spatial higher-harmonic only. The total electro-magnetic field analysis 131 is the same as in FIG. 7 and the permeability data 105 of each element in the magnetic substance is similarly saved. In the spatial higher-harmonic component analysis 132 of the potential a, the potential on the sliding surface bb', obtained in the total electro-magnetic field analysis 131, is developed into spatial higher-harmonic components as given by Formula (15).

[Formula 15]

$$a(\theta, z, t) = \sum_m A_m(z, t)\sin(m\theta + \alpha_m(z, t)) \quad (15)$$

The electro-magnetic field analysis 133 of leakage magnetic flux of the rotor and stator is the same as in FIG. 7. In the specific spatial higher-harmonic electro-magnetic field analysis 134, the permeability data 105 of each element in the magnetic substance obtained in the total electro-magnetic field analysis 131 is assigned to each element in the magnetic substance in each time step. The boundary condition is so specified that, when the potential on the outside peripheral surface ss' and inside peripheral surface rr' of the total analysis space 111 is set 0, similarly as in FIG. 2, the boundary surface sr and s'r' on each circumferential end are connected to each other under the periodic boundary condition. The boundary condition given by Formula (16), which is solely the specific m-th-order spatial higher-harmonic (m=0, 1, 2, . . . ) extracted from the potentials analyzed by Formula (15), is assigned on the sliding surface bb' of the outside peripheral analysis space 112 and sliding surface cc' of the inside peripheral analysis space 113.

[Formula 16]

$$a(\theta, z, t) = A_m(z, t)\sin(m\theta + \alpha_m(z, t)) \quad (16)$$

The current or magnetic force as applied in the total electro-magnetic field analysis 131 is no longer applied as the source of the electro-magnetic field and a linear analysis is accomplished. If a conductivity is specified in the total electro-magnetic field analysis 131 to compute eddy current, a similar conductivity can be specified and an analysis with consideration given to the eddy current is accomplished.

FIG. 9 shows a flowchart of the electro-magnetic field analysis according to the eighth embodiment of the present invention. The analysis in FIG. 9 differs from that in FIG. 7 in a point that the higher-harmonic handled by the analysis is time higher-harmonic only. The total electro-magnetic field analysis 141 is the same as in FIG. 7 and the permeability data 105 of each element is similarly saved. In the time higher-harmonic component analysis 142 of the potential a, the potential on the sliding surface bb', obtained in the total electro-magnetic field analysis 141, is developed into time higher-harmonic components as given by Formula (17).

[Formula 17]

$$a(\theta, z, t) = \sum_l A_l(\theta, z)\sin(l\omega t + \alpha_l(\theta, z)) \quad (17)$$

The electro-magnetic field analysis 143 of leakage magnetic flux of the rotor and stator is the same as in FIG. 7. In the specific time higher-harmonic electro-magnetic field analysis 144, the permeability data 105 of each element in the magnetic substance obtained in the total electro-magnetic field analysis 141 is assigned to each element in the magnetic substance in each time step. The boundary condition is so specified that, when the potential on the outside peripheral surface ss' and inside peripheral surface rr' of the total analysis space 111 is set 0, similarly as in FIG. 2, the boundary surface sr and s'r' on each circumferential end are connected to each other under the periodic boundary condition. The boundary condition given by Formula (18), which is solely the specific l-th-order time higher-harmonic extracted from the potentials analyzed by Formula (17), is assigned on the sliding surface bb' of the outside peripheral analysis space 112 and sliding surface cc' of the inside peripheral analysis space 113. [Formula 18]

$$a(\theta, z, t) = A_1(\theta, z)\sin(1\omega t + \alpha_1(\theta, z)) \quad (18)$$

The current or magnetic force as applied in the total electro-magnetic field analysis 141 is no longer applied as the source of the electro-magnetic field and a linear analysis is accomplished. If a conductivity is specified in the total electro-magnetic field analysis 141 to compute eddy current, a similar conductivity can be specified and an analysis with consideration given to the eddy current is accomplished.

In any of the embodiment described above, as shown in FIG. 10, the electro-magnetic field distribution obtained through a series of individual analyses of the rotor space and stator space on a computing device 151 can be displayed, for easier visual observation, on a display unit 152 separately by individual boundary condition.

The analytical technique described above can naturally be applied to a linear motor of which rotating radius is practically infinite. When applied, the analysis can be accomplished, for example, in the following procedures.

They are 1) a total electro-magnetic field analysis procedure of analyzing the total electro-magnetic field of a linear motor by assigning a boundary condition to the outer boundary surface of the analysis space and applying a magneto-motive force by current or magnetic force; 2) a procedure of storing the permeability distribution in the magnetic substance obtained in the total electro-magnetic field analysis procedure; 3) a procedure of developing the potential, which describes the electro-magnetic field distribution on the sliding surface between the needle and stator obtained in the total electro-magnetic field analysis, into multiple localized higher-harmonic components that have some distribution in the direction perpendicular to the moving direction and a constant or periodic distribution in the moving direction; 4) a procedure of accomplishing a linear electro-magnetic field analysis in each needle space including the needle and stator space including the stator, wherein the same boundary condition as in the total electro-magnetic field analysis is assigned, a Dirichlet's condition is assigned to the sliding surface, the permeability distribution is assigned to the whole analysis space, and current or magnetic force applied in the total electro-magnetic field analysis is applied; and 5) a procedure of accomplishing a linear electro-magnetic field analysis in each needle space including the needle and stator space including the stator, wherein the same boundary condition as in the total electro-magnetic field analysis is assigned, the analyzed higher-harmonic components are assigned, one after another, to the sliding surface as the boundary condition, the permeability distribution is assigned and fixed to the whole magnetic substance, and current or magnetic force is set zero. In addition to the above, it is also allowable to accomplish a procedure of displaying the electro-magnetic field distribution, which is obtained through a series of individual analyses of the needle space and stator space, separately by individual boundary conditions.

Descriptions in this specification are based on the embodiments but the present invention is not limited to those but can naturally be in various aspects and modes. For example, it is needless to say that the analytical method to be accomplished in accordance with the procedures in the above-mentioned analysis program or an analyzing device thereof is also included in the scope of the present invention.

(Effects of the Invention)

With the electro-magnetic field analysis technique of an electric rotating machine according to the present invention as described above, various problems caused by specific higher-harmonic component, including vibration, noise, iron loss, and eddy current loss, can be resolved quickly. That is, because the electro-magnetic field distribution of a specific higher-harmonic component or that of leakage magnetic flux alone can be obtained, contributing component in vibration, noise, iron loss or eddy current loss can be identified and a measures for reducing specific higher-harmonic electro-magnetic field from the magnetic flux rays can be determined easily. Thus, the invention produces an effect that the problems resulting from higher-harmonic component, including vibration, noise, iron loss, and eddy current loss, can be reviewed quickly and examination of possible measures for reducing them can be accelerated. Besides, because the technique is applicable not only to two-dimensional analysis but also to three-dimensional analysis, much more precise analysis becomes available.

What is claimed is:

1. An electro-magnetic field analysis program of an electric rotating machine for a computer to execute:
    the first electro-magnetic field analysis procedure of analyzing the electro-magnetic field in an analysis space based on the first boundary condition in terms of an electro-magnetic variable assigned to the first specific portion in the analysis space;
    a development procedure of developing the electro-magnetic variable at the second specific portion in the analytic space, obtained in the first electro-magnetic field analysis procedure, into each higher-harmonic component;
    the second boundary condition setting procedure of assigning an electro-magnetic variable in terms of at least one of the higher-harmonic components, developed from the above electro-magnetic variable, to the second specific portion as the second boundary condition; and
    a procedure of analyzing the electro-magnetic field of the analysis space based on the first and second boundary conditions.

2. An electro-magnetic field analysis program of an electric rotating machine according to claim 1, wherein, in the development procedure, the electro-magnetic variable is developed into each higher-harmonic component in terms of spatial distribution.

3. An electro-magnetic field analysis program of an electric rotating machine according to claim 1, wherein, in the development procedure, the electro-magnetic variable is developed into each higher-harmonic component in terms of time distribution.

4. An electro-magnetic field analysis program of an electric rotating machine according to claim 1, wherein the electro-magnetic variable is potential or magneto-motive force.

5. An electro-magnetic field analysis program of an electric rotating machine according to claim 1, wherein a storage procedure of storing the permeability distribution of the analysis space is included before the first electro-magnetic field analysis procedure, and, in the first and second electro-magnetic field analysis procedures, the electro-magnetic field analysis of the analysis space is based on the permeability distribution stored in the storage procedure.

6. An electro-magnetic field analysis program of an electric rotating machine according to claim 1, wherein the analysis space comprises an analysis space corresponding to the stator and an analysis space corresponding to the rotor, and the second specific portion is the boundary between the analysis space corresponding to the stator and analysis space corresponding to the rotor.

7. An electro-magnetic field analysis program of an electric rotating machine for a computer to execute:
    a total electro-magnetic field analysis procedure of analyzing the total electro-magnetic field of the electric rotating machine by assigning a boundary condition to the outer boundary surface of the analysis space and applying a magneto-motive force by current or magnetic force;
    a procedure of storing the permeability distribution in the magnetic substance obtained in the total electro-magnetic field analysis procedure;
    a procedure of developing the potential, which describes the electro-magnetic field distribution on the sliding surface between the rotor and stator obtained in the total electro-magnetic field analysis, into multiple higher-harmonic components that have some distribution in the axial direction and a constant or periodic distribution in the direction of rotation;
    a procedure of accomplishing a linear electro-magnetic field analysis in each rotor space including the rotor and stator space including the stator, wherein the same boundary condition as in the total electro-magnetic field analysis procedure is assigned, a Dirichlet's condition is assigned to the sliding surface, the stored permeability distribution is assigned and fixed to the whole analysis space, and current or magnetic force applied in the total electro-magnetic field analysis procedure is applied; and
    a procedure of accomplishing a linear electro-magnetic field analysis in each rotor space including the rotor and stator space including the stator, wherein the same boundary condition as in the total electro-magnetic field analysis procedure is assigned, the higher-harmonic components are assigned, one after another, to the sliding surface as the boundary condition, the permeability distribution is assigned to the whole magnetic substance, and current or magnetic force is set zero.

8. An electro-magnetic field analysis program of an electric rotating machine according to claim 7, wherein, in the case of analyzing a three-dimensional rotating structure, in the procedure of analyzing the electro-magnetic field of the electric rotating machine by assigning a boundary condition to the outer boundary surface of the analysis space and applying a magneto-motive force by current or magnetic force, a procedure of converting a potential obtained under a gage-free or partially gage-free condition into a potential meeting the gage condition is executed before the procedure of developing the potential into the higher-harmonic components.

9. An electro-magnetic field analysis program of an electric rotating machine according to claim 7 or 8, wherein a procedure of displaying the electro-magnetic field distribution, obtained through individual analysis in the above-mentioned each rotor space and stator space, individually by each assigned boundary condition.

10. An electro-magnetic field analysis program of an electric rotating machine for a computer to execute:
- a total electro-magnetic field analysis procedure of analyzing the total electro-magnetic field of the electric rotating machine in a series of time steps by assigning a boundary condition to the outer boundary surface of the analysis space and applying a magneto-motive force by current or magnetic force;
- a procedure of storing the permeability distribution in the magnetic substance in a series of time steps obtained in the total electro-magnetic field analysis procedure;
- a procedure of developing and storing the potential, which describes the electro-magnetic field distribution on the sliding surface between the rotor and stator obtained in the total electro-magnetic field analysis, into multiple higher-harmonic components that have some distribution in the axial direction and a constant or periodic distribution in the direction of rotation;
- a procedure of abstracting the time and spatial higher-harmonic components by developing the multiple higher-harmonic components which, obtained in the above analysis in a series of time steps, have a constant or periodic distribution in the direction of rotation into higher-harmonic components along the time axis;
- a procedure of accomplishing a linear electro-magnetic field analysis in each rotor space including the rotor and stator space including the stator, wherein the same boundary condition as in the total electro-magnetic field analysis procedure is assigned, a Dirichlet's condition is assigned to the sliding surface, current or magnetic force applied in the total electro-magnetic field analysis procedure is applied, and the permeability distribution in the magnetic substance in a series of time steps is assigned in each time step; and
- a procedure of accomplishing a linear electro-magnetic field analysis in each rotor space including the rotor and stator space including the stator, wherein the same boundary condition as in the total electro-magnetic field analysis procedure is assigned, the time and spatial higher-harmonic components are assigned, one after another, to the sliding surface as the boundary condition, the permeability distribution in the magnetic substance in a series of time steps is assigned and fixed in each time step, and current or magnetic force is set zero.

11. An electro-magnetic field analysis program of an electric rotating machine according to claim 10, wherein, in the case of analyzing a three-dimensional rotating structure, in the procedure of analyzing the electro-magnetic field of the electric rotating machine by assigning a boundary condition to the outer boundary surface of the analysis space and applying a magneto-motive force by current or magnetic force, a procedure of converting a potential obtained under a gage-free or partially gage-free condition into a potential meeting the gage condition is executed before the procedure of developing the potential into the higher-harmonic components.

12. An electro-magnetic field analysis program of an electric rotating machine according to claim 10, wherein a procedure of displaying the electro-magnetic field distribution, obtained through individual analysis in the above-mentioned each rotor space and stator space, individually by each assigned boundary condition.

13. An electro-magnetic field analysis program of an electric rotating machine according to claim 11, wherein a procedure of displaying the electro-magnetic field distribution, obtained through individual analysis in the above-mentioned each rotor space and stator space, individually by each assigned boundary condition.

* * * * *